May 10, 1949.    F. E. BACHMAN    2,469,912
SHOCK STRUT
Filed May 26, 1944
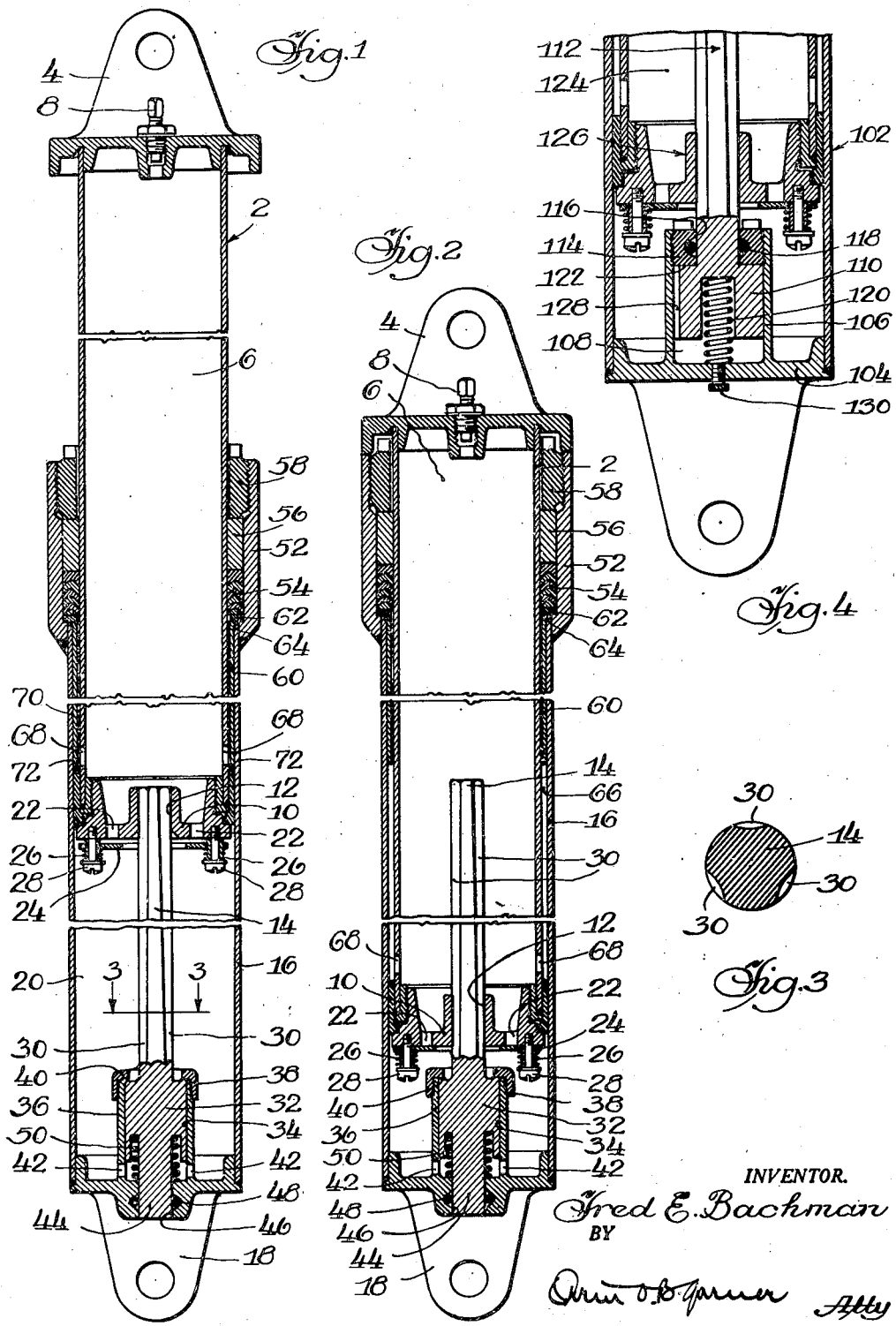
INVENTOR.
Fred E. Bachman
BY
Atty Patented May 10, 1949

2,469,912

UNITED STATES PATENT OFFICE 2,469,912

SHOCK STRUT

Fred E. Bachman, Chicago, Ill., assignor to American Steel Foundries, Chicago, Ill., a corporation of New Jersey Application May 26, 1944, Serial No. 537,478

22 Claims. (Cl. 267—64)

My invention relates to shock absorbers and more particularly to an hydraulic device commonly termed an oleo strut and utilized in the connection between the fuselage and landing gear of an aircraft.

The primary object of my invention is to design a novel oleo strut of the type in which a hollow piston reciprocates within a cylinder carrying a metering pin which in turn reciprocates within a passage through the piston head communicating with an internal chamber therewithin, the metering pin being of tapered cross-sectional area to define with said passage an orifice of gradually decreasing cross-sectional area through which hydraulic fluid within the device is metered on the closure stroke thereof.

My novel strut is so constructed that the piston head passage and the associated metering pin are relatively movable, as the result of inertia during vertical movement of the device as the craft to which it is attached passes over irregularities in the terrain or water. By means of this arrangement, the cross-sectional area of the orifice defined by the pin and the piston head passage is momentarily increased in response to vertical movement of the strut as a unit, thus lessening the resistance thereof to its closure stroke and thereby softening the shock to the associated craft.

Another object of my invention is to design a strut of the above type in which the metering pin is slidably carried at all times by the associated piston head passage and is provided with tapered grooves or flutes defining with said passage an orifice through which the hydraulic fluid is metered on the closure stroke of the device.

A different object of my invention is to provide a novel dashpot construction for dampening the extension stroke of the device at the end of said stroke.

In the drawings,

Figure 1 is a sectional view through a novel expanded oleo strut embodying my invention, portions of the device being shown in elevation.

Figure 2 is a sectional view comparable to Figure 1 but illustrating the strut at the end of the closure stroke thereof.

Figure 3 is a sectional view through the metering pin taken on the line 3—3 of Figure 1.

Figure 4 is a fragmentary view comparable to Figure 2, but illustrating a modification of my invention.

Describing my invention in detail and referring first to the embodiment thereof illustrated in Figures 1-3 inclusive, the device comprises a top follower in the form of a hollow piston 2 including a bracket 4 at its upper extremity for convenient connection to the fuselage of an associated aircraft (not shown). The piston 2 comprises an internal low pressure chamber 6 to which compressed air may be admitted through the fitting 8 to afford an air spring operable to resist the closure stroke of the device, as will be clearly understood by those skilled in the art. The piston 2 includes a piston head 10 with a central cylindrical passage 12 therethrough for the reception of a complementary metering pin 14 mounted within the cylinder 16 as hereinafter more particularly described, said cylinder constituting the bottom follower of the device and comprising at its lower extremity a bracket 18 for convenient connection to the landing gear (not shown) of the associated craft.

The piston head 10 is slidably reciprocal within the high pressure chamber 20 of the cylinder 16, and said head includes spaced passages 22, 22 disposed around the central passage 12, said passages being closed by a flapper valve assembly including an annular flapper plate 24 resiliently urged to its closed position against the passages 22, 22 by means of springs 26, 26 carried by stud bolts 28, 28 mounted on the piston head 10. It will be understood by those skilled in the art that on the compression or closure stroke of the device, the hydraulic pressure within the high pressure chamber 20 is operable in conjunction with the springs 26, 26 to urge the flapper plate 24 to its closed position, whereby the hydraulic fluid within the device is metered through the orifice defined by the passage 12 and the metering pin 14, as hereinafter particularly described. On the extension stroke of the device, the hydraulic pressure within the low pressure chamber 6 exceeds that within the high pressure chamber 20 and is thus operable to move the flapper plate 24 to its open position, as seen in Figure 1, against the resistance of the springs 26, 26. This permits the fluid to flow from the chamber 6 into the chamber 20 through the passages 22, 22, thus insuring rapid release or extension of the device, as is desirable under service conditions.

It may be noted that the metering pin 14 is provided with a plurality of longitudinally extending flutes or grooves 30, 30 defining with the passage 12 orifices through which the hydraulic fluid is metered from the high pressure chamber 20 into the low pressure chamber 6 on the closure stroke of the device, said flutes tapering toward the lower piston-like portion 32 of the metering pin 14 which is slidably fitted within the chamber 34 formed within the cylinder 16 at its lower extremity, said chamber being defined by the cylindrical wall 36 on which is threaded a cap 38 engageable at 40 with the upper extremity of the piston-like portion 32 to limit upward movement of the metering pin 14 relative to the cylinder 16.

The wall 36 is provided with openings 42, 42 adjacent the lower extremity thereof through which pressure fluid may pass to act upon the lower end of the portion 32 which is provided with a cylindrical member 44 extending downwardly through an opening 46 in the bottom of the cylinder 16, said opening being provided with an oleo ring 48 of conventional design to prevent leakage of hydraulic fluid. The portion 32 is normally urged into engagement at 40 with the cap 38 by means of a spring 50, and in this connection it may be noted that the cross-sectional area of the member 32 which is exposed to fluid pressure within the lower extremity of the chamber 34 is substantially equal to the cross-sectional area of the exposed upper extremity of the portion 32. By this arrangement the hydraulic pressure within the high pressure chamber tending to urge the metering pin upwardly therewithin are balanced by the hydraulic pressure tending to urge the metering pin downwardly. Thus, when the strut is moved upwardly as a unit as the landing gear to which it is attached passes over an irregularity in the terrain, the inertia of the metering pin 14 causes the latter to compress the spring 50 in order to permit the cylinder 16 and the piston 2 to move upwardly with respect to the metering pin 14. This action results in relative upward movement of the passage 12 with respect to the metering pin 14, thereby increasing the cross-sectional area of the orifice defined by said passage 12 and the flutes 30, 30 which are flared toward their upper extremities, as heretofore described. Thus, when the aircraft to which the strut is attached passes over an irregularity in the terrain resulting in unusual upward movement of the strut and the associated landing gear, the orifice defined by the passage 12 and the flutes 30, 30 is momentarily enlarged, thereby cushioning the resultant shock to the associated craft.

It may be noted that while the above described construction of the metering pin and orifice is extremely useful in the illustrated arrangement in providing slidable guidance for the metering pin 14 throughout the extension and closure stroke of the device, nevertheless, if desired, this feature may be eliminated and the metering pin may be formed as a solid conical member tapering toward the upper extremity thereof and being of less cross-sectional area from end to end thereof than the passage 12, as will be clearly understood by those skilled in the art, inasmuch as the use of such a pin is conventional practice.

The cylinder 16 is provided at its upper end with a collar 52 within which is positioned an annular packing gland 54 of conventional design and a bearing 56 of brass or any other suitable metal, the bearing and packing gland being held in assembled relationship within the collar 52 by means of a packing gland nut 58. A sleeve 60 is secured within the cylinder 16 by means of a ring 62 compressed between the upper end of the sleeve and the packing gland 54, said sleeve having a shoulder 64 seated against a complementary shoulder within the cylinder 16. The sleeve 60 defines with the piston 2 an annular chamber 66 which communicates with the low pressure chamber 6 by means of openings 68, 68 through said piston, and it will be understood that on the extension stroke of the piston, as shown in Figure 1, when the sleeve 60 moves within the portion of the passage 66 beneath the openings 68, 68, hydraulic fluid is entrapped within said portion of the passage 66, which thus may be regarded as a dashpot chamber 70 (Figure 1). The entrapped fluid is gradually metered through the openings 68, 68 through the space between the sleeve 60 and the adjacent wall of the piston 2, thus dampening the extension stroke of the device at the end of said stroke wherein the sleeve 60 bears as at 72 (Figure 1) against a portion of the piston head 10.

Referring now to Figure 4 which is a fragmentary sectional view comparable to the lower portion of Figure 2, the cylinder 102 is provided at its lower extremity with a closure 104 including an annular wall 106 defining a cylindrical chamber 108 within which is slidably fitted the piston-like extremity 110 of the metering pin generally designated 112. The upper extremity of the chamber 108 is closed by a nut 114 having a central opening 116 through which the metering pin 112 is slidably fitted, the engagement between the pin and the opening 116 being made substantially fluid tight by means of an oil ring 118. The piston-like portion 110 of the metering pin is urged by means of a spring 120 to its uppermost position in engagement as at 122 with the nut 114, and it will be understood that the spring 120 is so designed as to be strong enough to resist the maximum fluid pressure within the low pressure chamber 124, which pressure is operable to urge the metering pin downwardly relative to the cylinder 102; however, the spring 120 is nevertheless weak enough to permit the metering pin 112 to move downwardly against the resistance of the spring whenever the force exerted thereagainst by means of the inertia of the metering pin during relative upward movement of the strut as a unit is sufficient to overcome the resistance of the spring 120.

The piston generally designated 126 is substantially identical with that illustrated in Figures 1 and 2.

It may be noted that the piston-like portion 110 of the metering pin is provided with one or more passages 128 permitting the passage of air within the chamber 108 between the upper and lower extremities thereof as the metering pin reciprocates within said chamber under the circumstances above described. A breather 130 may be provided within the lower extremity of the chamber 108 to permit free passage of air between said chamber and the atmosphere externally thereof. Either the breather 130 or the passage 128 may be eliminated, if desired.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In an hydraulic shock strut, a bottom follower in the form of a cylinder comprising a high pressure chamber, a cylindrical metering chamber in the bottom of said cylinder, a cylindrical metering pin with a piston-like portion at one end thereof slidably fitted within said chamber, abutment means for limiting movement of said portion outwardly with respect to said second-mentioned chamber, resilient means for yieldingly urging said portion against said abutment means, a top follower in the form of a hollow piston having an internal low pressure chamber and a head slidably fitted within said high pressure chamber for vertical reciprocation therewithin, said head comprising a cylindrical opening affording communication between said high and low pressure chambers, said pin being slidably fitted at all times during extension and closure of the strut within said opening, longitudinal flutes in the perimeter of said pin extending from a point adjacent said piston-like portion thereof to the opposite extremity thereof and flaring toward said opposite extremity, a passage through said head spaced from said opening and affording communication between said high and low pressure chambers, and a flapper plate resiliently mounted on said head within said high pressure chamber for closing said passage on the closure stroke of the strut.

2. In an oleo strut, a bottom cylinder, a metering pin carried thereby and vertically movable with respect thereto, abutment means limiting relative upward movement of said pin with respect to said cylinder, yielding means for urging a portion of said pin against said abutment means, said yielding means being so formed and arranged as to accommodate relative upward movement of said cylinder with respect to said pin because of the inertia thereof during upward movement of said strut, a hollow piston reciprocal within said cylinder and comprising an internal chamber and a piston head with an orifice within which said pin is slidably fitted, said orifice communicating with said chamber, passages in the sides of said pin extending longitudinally thereof to the upper extremity thereof, said passages tapering in cross-sectional area from said extremity, and flapper valve means for accommodating passage of hydraulic fluid from the interior of said piston to said cylinder on the extension stroke of the strut, said valve means being operable on the closure stroke of the strut to prevent passage of hydraulic fluid from said cylinder to the interior of said piston.

3. In an oleo strut, a bottom cylinder, a metering pin carried thereby and vertically movable with respect thereto, abutment means limiting relative upward movement of said pin with respect to said cylinder, yielding means for urging a portion of said pin against said abutment means, said yielding means being so formed and arranged as to accommodate relative upward movement of said cylinder with respect to said pin because of the inertia of the pin during upward movement of said strut, and a hollow piston reciprocal within said cylinder and comprising an internal chamber and a piston head with an orifice within which said pin is slidably fitted, said orifice communicating with said chamber.

4. In an hydraulic shock strut, a bottom follower in the form of a cylinder, a cylindrical metering pin chamber in the bottom of said cylinder, a cylindrical metering pin with a piston-like portion at one end thereof slidably fitted within said chamber, abutment means for limiting relative upward movement of said portion with respect to said chamber, resilient means in said chamber for urging said portion into engagement with said abutment means, a top follower in the form of a hollow piston having an internal chamber and a head slidably fitted within said cylinder for reciprocation therewithin, said head having a cylindrical opening communicating with said last-mentioned chamber, said pin being slidably fitted at all times during extension and closure of said strut within said opening, longitudinal flutes in the perimeter of said pin extending from a point adjacent said piston-like portion thereof to the opposite extremity thereof and flaring toward said opposite extremity, and a compressed air spring in the upper extremity of said last-mentioned chamber for yieldingly resisting the closure stroke of said strut.

5. In an oleo strut, a bottom cylinder, a metering pin carried thereby and vertically movable with respect thereto, abutment means limiting relative upward movement of said pin with respect to said cylinder, yielding means for urging a portion of said pin against said abutment means, said yielding means being so formed and arranged as to accommodate relative upward movement of said cylinder with respect to said pin because of the inertia thereof during sudden upward movement of said strut as a unit, a hollow piston reciprocal within said cylinder and comprising an internal chamber and a piston head with an orifice within which said pin is slidably reciprocal at all times during extension and closure of the strut, said orifice communicating with said chamber, passages in the sides of said pin extending longitudinally thereof from a point adjacent said portion to the upper extremity of said pin, said passages tapering in cross-sectional area from said upper extremity, and a compressed air spring in the upper extremity of said chamber for resiliently resisting the closure stroke of said strut.

6. In an hydraulic shock strut, a bottom follower in the form of a cylinder, a cylindrical metering pin chamber in the bottom of said cylinder, a cylindrical metering pin with a piston-like portion at one end thereof slidably fitted within said chamber, means for limiting relative upward movement of said portion with respect to said chamber for vertical reciprocation therewithin, a spring in said chamber bearing against abutment means on said portion and the bottom of siad chamber, a top follower in the form of a hollow piston having a head reciprocal within said cylinder, said head comprising a cylindrical opening, said pin being slidably fitted at all times within said opening, longitudinal flutes in the perimeter of said pin extending from a point adjacent said portion to the opposite end of said pin and flaring toward said opening, and resilient means compressible on the closure stroke of said strut and operable to return said top follower to its normal extended position.

7. In an hydraulic shock strut, a bottom follower in the form of a cylinder, a cylindrical metering pin chamber in the bottom of said cylinder, a metering pin with a piston-like portion at one end thereof slidably fitted within said chamber, abutment means for limiting relative upward movement of said portion with respect to said chamber, resilient means housed within said chamber for yieldingly urging said portion against said abutment means, a top follower in the form of a hollow piston having a head reciprocal within said cylinder and comprising an opening affording communication of hydraulic fluid between said cylinder and the interior of said piston, said pin being tapered in cross-sectional area from said piston-like portion thereof to the opposite extremity thereof and being reciprocal within said opening.

8. In an oleo strut, a bottom cylinder, a metering pin carried thereby and vertically movable with respect thereto, abutment means limiting relative upward movement of said pin with respect to said cylinder, yielding means for urging a portion of said pin against said abutment means, said yielding means being so formed and arranged as to accommodate relative upward movement of said cylinder with respect to said pin because of the inertia thereof during upward movement of said strut, a hollow piston reciprocal within said cylinder and comprising an internal chamber and a piston head with an orifice within which said pin is slidably fitted, said orifice communicating with said chamber, and passages in the sides of said pin extending longitudinally thereof to the upper extremity thereof, said passages tapering in cross-sectional area from said extremity.

9. In an oleo strut, a bottom cylinder, a metering pin carried thereby and vertically movable with respect thereto, abutment means limiting relative upward movement of said pin with respect to said cylinder, yielding means for urging a portion of said pin against said abutment means, said yielding means being so formed and arranged as to accommodate relative upward movement of said cylinder with respect to said pin because of the inertia thereof during upward movement of said strut, and a hollow piston reciprocal within said cylinder and comprising an internal chamber and a piston head with an orifice within which said pin is reciprocal, said orifice communicating with said chamber, said pin tapering longitudinally thereof in cross-sectional area.

10. In an oleo strut, a cylinder, a cylindrical metering pin carried thereby, a hollow piston reciprocal within said cylinder and comprising a head slidably fitted therein, a central cylindrical opening through said head communicating with a chamber within said piston, said metering pin being slidably fitted at all times during closure and extension of said strut within said opening, longitudinal grooves in the cylindrical perimeter of said pin extending from one end thereof toward its connection with said cylinder, said grooves flaring toward said extremity, said pin being capable of vertical movement with respect to said cylinder, stop means carried by the cylinder for limiting vertical movement of the pin with respect thereto, and yielding means for urging said pin into engagement with said stop means, said yielding means being formed and arranged to accommodate said movement due to inertia of said pin during sudden vertical movement of said strut.

11. In an hydraulic shock strut, top and bottom followers, one of said followers being a cylinder carrying a metering pin, and the other of said followers being a hollow piston with an internal low pressure chamber and a piston head slidably fitted within said cylinder to define a high pressure chamber therein, said piston head comprising an opening affording fluid connection between said chambers, said pin tapering in cross-sectional area from its connection with said cylinder and being reciprocal within said opening, a spring entirely independent of pressure exerted in said high pressure chamber by associated hydraulic fluid therein, said spring accommodating, but yieldingly resisting, relative vertical movement between said pin and said cylinder as the result of inertia of said pin during unusual vertical movement of said strut and irrespective of the relative positions of said piston and cylinder, and a compressed air spring in the upper extremity of said low pressure chamber for yieldingly resisting the closure stroke of said strut.

12. In an hydraulic shock strut, a bottom follower in the form of a cylinder carrying a metering pin, a top follower in the form of a hollow piston with an internal low pressure chamber and a piston head reciprocal within said cylinder to define one end of a high pressure chamber therein, said head comprising an opening affording means of fluid communication between said chambers, said pin being reciprocal within said opening and defining therewith an orifice, and spring means accommodating, but yieldingly resisting, relative vertical movement between said pin and said cylinder as the result of inertia of said pin during sudden vertical movement of said strut and irrespective of the relative positions of said piston and said cylinder, said spring means being at all times substantially free from pressure exerted by associated hydraulic fluid in said high pressure chamber.

13. In an hydraulic shock strut, a bottom follower in the form of a cylinder, a cylindrical metering pin chamber in the bottom of said cylinder, a cylindrical metering pin with a piston-like portion at one end thereof slidably fitted within said chamber for vertical reciprocation therewithin, a spring in said chamber bearing against abutment means on said portion and the bottom of said chamber, a top follower in the form of a hollow piston having a head reciprocal within said cylinder, said head comprising a cylindrical opening, said pin being slidably fitted at all times within said opening, and longitudinal flutes in the perimeter of said pin extending from a point adjacent said portion to the opposite end of said pin and flaring toward said opening.

14. In an oleo strut, a cylinder, a metering pin carried thereby and vertically movable with respect thereto, abutment means limiting relative upward movement of said pin with respect to said cylinder, yielding means for urging a portion of said pin against said abutment means, said yielding means being so formed and arranged as to accommodate relative upward movement of said cylinder with respect to said pin because of the inertia of the pin during upward movement of said strut, a hollow piston reciprocal within said cylinder and comprising an internal chamber and a piston head with an orifice within which said pin is slidably fitted, said orifice communicating with said chamber, said piston defining with the wall of said cylinder an annular chamber above said head communicating with said first-mentioned chamber through an opening in said piston, and a sleeve carried by said cylinder within said annular chamber, said sleeve bearing against said wall and being slightly spaced from said piston to define therewith an annular dashpot chamber when said piston is in its fully extended position, said piston head having abutment means engageable with said sleeve beneath said opening to limit the extension stroke of said piston.

15. In an hydraulic shock strut, a pair of followers, one of said followers being a cylinder carrying a metering pin and the other of said followers being a hollow piston with an internal low pressure chamber and a piston head defining a high pressure chamber within said cylinder and comprising an opening connecting said chambers, said pin varying longitudinally thereof in cross-sectional area and being reciprocal within said opening and defining therewith an orifice, and means independent of pressure within said high pressure chamber for accommodating, and yieldingly resisting relative movement between said pin and said cylinder as the result of inertia of said pin during sudden vertical movement of said strut.

16. In an hydraulic shock strut, a bottom follower in the form of a cylinder, a cylindrical metering pin chamber in the bottom of said cylinder, a cylindrical metering pin with a pistonlike portion at one end thereof slidably fitted within said chamber for vertical reciprocation therewithin, a spring in said chamber bearing against abutment means on said portion and the bottom of said chamber, a top follower in the form of a hollow piston having a head reciprocal within said cylinder, said head comprising a cylindrical opening, said pin tapering in cross-sectional area from its connection with said cylinder and being slidably fitted at all times within said opening.

17. In an hydraulic shock strut, a follower in the form of a cylinder comprising a high pressure chamber, a casing in said cylinder at the bottom thereof and forming a cylindrical metering pin chamber, a cylindrical metering pin with an enlarged pistonlike portion at one end thereof slidably fitted within the chamber of said casing, abutment means on said casing for limiting relative upward movement of said portion with respect to said casing and having a fluid passage communicating with said high pressure chamber and through which said pin extends, resilient means in said chamber for urging said portion into engagement with said abutment means, fluid passages in said casing communicating with the lower extremity of said cylindrical chamber, a hollow piston reciprocal within said cylinder and comprising an internal low pressure chamber and a piston head with an orifice communicating with said high and low pressure chambers, said pin being slidably fitted at all times within said orifice during extension and closure of said strut.

18. In a hydraulic shock strut, a follower in the form of a cylinder comprising a high pressure chamber, a casing in said cylinder at the bottom thereof and forming a cylindrical metering pin chamber, a cylindrical metering pin with an enlarged pistonlike portion at one end thereof slidably fitted within the chamber of said casing, abutment means on said casing for limiting relative upward movement of said portion with respect to said casing and having a fluid passage communicating with said high pressure chamber and through which said pin extends, resilient means in said chamber for urging said portion into engagement with said abutment means, fluid passages in said casing communicating with the lower extremity of said cylindrical chamber, a hollow piston reciprocal within said cylinder and comprising an internal low pressure chamber and a piston head with an orifice communicating with said high and low pressure chambers, said pin tapering in cross-sectional area between said pistonlike portion thereof and the opposite extremity thereof and being reciprocal within said orifice at all times during extension and closure of the strut.

19. In an hydraulic shock strut, a follower in the form of a cylinder comprising a fluid chamber, a casing in said cylinder at the bottom thereof and forming a cylindrical chamber, a cylindrical metering pin with an enlarged pistonlike portion slidably fitted within said casing, abutment means at the upper end of said casing for limiting upward movement of said portion with respect to said casing and having an opening through which said pin extends, means confined between said pin and said abutment means for preventing flow of fluid between said chambers, resilient means in said casing for urging said portion into engagement with said abutment means, a passage within said portion for the passage of fluid within said cylindrical chamber between the lower and upper extremities thereof on reciprocation of said pin, another follower comprising a hollow piston reciprocal within said cylinder and a piston head with an orifice communicating with said fluid chamber, said pin being slidably fitted at all times within said orifice during extension and closure of said strut and tapering in cross-sectional area between said pistonlike portion thereof and the opposite extremity thereof.

20. In an hydraulic shock strut, a follower in the form of a cylinder comprising a fluid chamber, a casing in said cylinder at the bottom thereof and forming a cylindrical chamber having an opening at the lower end thereof, a cylindrical metering pin with an enlarged pistonlike portion slidably fitted within said casing, abutment means at the upper end of said casing for limiting upward movement of said portion with respect to said casing and having an opening through which said pin extends, means between said pin and said abutment means for preventing flow of fluid from said fluid chamber into said cylindrical chamber, resilient means in said casing for urging said portion into engagement with said abutment means, another follower comprising a hollow piston reciprocal within said cylinder and a piston head with an orifice communicating with said fluid chamber, said pin being slidably fitted at all times within said orifice during extension and closure of said strut.

21. In an hydraulic shock strut, a follower in the form of a cylinder comprising a fluid chamber, a casing in said cylinder at the bottom thereof and forming a cylindrical chamber, a cylindrical metering pin with an enlarged pistonlike portion slidably fitted within said casing, abutment means at the upper end of said casing for limiting upward movement of said portion with respect to said casing and having an opening through which said pin extends, means between said pin and said abutment means for preventing flow of fluid from said fluid chamber into said cylindrical chamber, resilient means in said casing for urging said portion into engagement with said abutment means, another follower comprising a hollow piston reciprocal within said cylinder and a piston head with an orifice communicating with said fluid chamber, said pin being slidably fitted at all times within said orifice during extension and closure of said strut.

22. In an hydraulic shock absorber, a bottom follower in the form of a cylinder, a metering pin carried thereby, said pin varying longitudinally thereof in cross-sectional area and being capable of vertical movement relative to said cylinder, a top follower in the form of a hollow piston containing an internal low pressure chamber, a piston head on said piston reciprocal within said cylinder and defining the upper extremity of a high pressure chamber therewithin, said head having an opening receiving said pin and defining therewith an orifice connecting said chambers, a spring carried by said cylinder and adapted to yieldingly resist upward movement of the cylinder relative to said pin, the hydraulic pressure on the portion of said pin in said high pressure chamber being substantially equalized whereby during sudden upward movement of said absorber the cylinder moves upwardly with respect to said pin due to the inertia of said pin thereby varying the cross-sectional area of said orifice.

FRED E. BACHMAN.

REFERENCES CITED

The following references are of record in the file of this patent:

UNITED STATES PATENTS

| Number | Name | Date |
|---|---|---|
| 1,037,052 | Rennie | Aug. 27, 1912 |
| 1,956,668 | Charles | May 1, 1934 |
| 2,039,135 | Waugh et al. | Apr. 28, 1936 |
| 2,095,112 | Wallace | Oct. 5, 1937 |
| 2,148,497 | Peck | Feb. 28, 1939 |
| 2,156,117 | Johnson | Apr. 25, 1939 |
| 2,186,011 | De Port | Jan. 9, 1940 |
| 2,212,541 | Isaacson | Aug. 27, 1940 |
| 2,222,845 | Johnson | Nov. 26, 1940 |
| 2,224,306 | Krueger | Dec. 10, 1940 |
| 2,363,308 | Focht | Nov. 21, 1944 |

FOREIGN PATENTS

| Number | Country | Date |
|---|---|---|
| 375,205 | Great Britain | June 23, 1932 |
| 637,666 | Great Britain | Feb. 6, 1928 |
| 754,307 | France | Aug. 28, 1933 |